US008717391B2

(12) United States Patent
Bratt et al.

(10) Patent No.: US 8,717,391 B2
(45) Date of Patent: May 6, 2014

(54) USER INTERFACE PIPE SCALERS WITH ACTIVE REGIONS

(75) Inventors: Joseph P. Bratt, San Jose, CA (US); Peter F. Holland, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 634 days.

(21) Appl. No.: 12/950,267

(22) Filed: Nov. 19, 2010

(65) Prior Publication Data

US 2012/0127193 A1 May 24, 2012

(51) Int. Cl.
*G09G 5/00* (2006.01)
*G06F 13/00* (2006.01)
*G09G 5/02* (2006.01)

(52) U.S. Cl.
USPC ............ 345/660; 345/538; 345/592; 345/629

(58) Field of Classification Search
CPC .......... H04N 21/4856; H04N 21/4858; H04N 21/4884; H04N 21/4886
USPC ................. 345/530, 545, 581, 590, 537–538, 345/548–549, 592, 629–641, 660–671
See application file for complete search history.

(56) References Cited

U.S. PATENT DOCUMENTS

| | | | | |
|---|---|---|---|---|
| 5,719,594 | A * | 2/1998 | Potu | 345/667 |
| 5,914,725 | A * | 6/1999 | MacInnis et al. | 345/441 |
| 5,966,116 | A * | 10/1999 | Wakeland | 345/658 |
| 6,108,047 | A * | 8/2000 | Chen | 348/581 |
| 6,226,017 | B1 * | 5/2001 | Goossen et al. | 345/531 |
| 7,034,791 | B1 * | 4/2006 | Odom | 345/98 |
| 7,489,317 | B2 * | 2/2009 | Tuomi et al. | 345/581 |
| 7,489,320 | B2 * | 2/2009 | Rai et al. | 345/589 |
| 7,567,259 | B2 * | 7/2009 | Winger | 345/629 |
| 7,633,555 | B2 | 12/2009 | Yang et al. | |
| 2003/0126182 | A1 * | 7/2003 | Wyatt | 709/104 |
| 2004/0001071 | A1 * | 1/2004 | Noyle | 345/589 |
| 2005/0094899 | A1 * | 5/2005 | Kim et al. | 382/300 |
| 2006/0050089 | A1 * | 3/2006 | Soroushi | 345/660 |
| 2006/0282855 | A1 * | 12/2006 | Margulis | 725/43 |
| 2008/0001967 | A1 * | 1/2008 | Rengarajan et al. | 345/629 |
| 2008/0231755 | A1 * | 9/2008 | Suba | 348/699 |
| 2009/0097743 | A1 | 4/2009 | Quan | |
| 2009/0123089 | A1 | 5/2009 | Karlov et al. | |
| 2009/0201306 | A1 * | 8/2009 | Dyke | 345/545 |

* cited by examiner

*Primary Examiner* — Xiao Wu
*Assistant Examiner* — Michael J Cobb
(74) *Attorney, Agent, or Firm* — Lawrence J. Merkel; Meyertons, Hood, Kivlin, Kowert & Goetzel, P.C.

(57) ABSTRACT

A display pipe may include fetch circuitry and a scaler unit, and registers programmable with information that defines active regions of an image frame. Pixels within the active regions are active pixels to be displayed, pixels outside of the active regions are inactive pixels not to be displayed. The fetch circuitry may retrieve frames from memory, retrieving the active pixels and not retrieving the inactive pixels as defined by the programmed contents of the registers. A scaler unit may produce scaled pixels from the fetched pixels, basing each scaled pixel on a respective corresponding set of pixels. When a given pixel of the respective corresponding set of pixels is an inactive pixel, the scaler unit may assign an estimated value to the given pixel based on one or more active pixels in the respective corresponding set of pixels. The scaler unit may provide the scaled pixels to a blend unit for blending with other pixels.

23 Claims, 6 Drawing Sheets

Width x Height = Scale Region

USER INTERFACE PIPE SCALERS WITH ACTIVE REGIONS

BACKGROUND

1. Field of the Invention

This invention is related to the field of graphical information processing, more particularly, to conversion from one color space to another.

2. Description of the Related Art

Part of the operation of many computer systems, including portable digital devices such as mobile phones, notebook computers and the like is the use of some type of display device, such as a liquid crystal display (LCD), to display images, video information/streams, and data. Accordingly, these systems typically incorporate functionality for generating images and data, including video information, which are subsequently output to the display device. Such devices typically include video graphics circuitry to process images and video information for subsequent display.

In digital imaging, the smallest item of information in an image is called a "picture element", more generally referred to as a "pixel". For convenience, pixels are generally arranged in a regular two-dimensional grid. By using this arrangement, many common operations can be implemented by uniformly applying the same operation to each pixel independently. Since each pixel is an elemental part of a digital image, a greater number of pixels can provide a more accurate representation of the digital image. The intensity of each pixel can vary, and in color systems each pixel has typically three or four components such as red, green, blue, and black.

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically includes a specified number of pixels according to the resolution of the image/video frame. Most graphics systems use frame buffers to store the pixels for image and video frame information. The term "frame buffer" therefore often denotes the actual memory used to hold picture/video frames. The information in a frame buffer typically includes color values for every pixel to be displayed on the screen. Color values are commonly stored in 1-bit monochrome, 4-bit palletized, 8-bit palletized, 16-bit high color and 24-bit true color formats. An additional Alpha channel is oftentimes used to retain information about pixel transparency. The total amount of the memory required for frame buffers to store image/video information depends on the resolution of the output signal, and on the color depth and palette size.

The frame buffers can be situated in memory elements dedicated to store image and video information, or they can be situated in the system memory. Consequently, system memory may be used to store a set of pixel data that defines an image and/or video stream for display on a display device. Typically, applications running in such a system can write the pixel data into the system memory, from where the pixel data may be fetched and processed to generate a set of image/video signals for displaying the image on the display device. Oftentimes, the processing of these pixels includes upscaling the pixels, which is typically performed according to one or more of a number of scaling algorithms. Two standard scaling algorithms are bilinear and bicubic interpolation, which operate by interpolating pixel color values, usually generating an output pixel with a color value based on a value interpolated between four input pixel values. Fetching the frames (pixel information) from system memory may place high demands on the system, as other devices may also be competing for memory access. As consequence, a high bandwidth may be required from memory in order to keep up with the requests for data. In addition, as each system memory access requires a certain amount of processing power, requests for high volume pixel data may eventually result in premature battery depletion in battery-operated devices, such as mobile phones and notebook computers.

Other corresponding issues related to the prior art will become apparent to one skilled in the art after comparing such prior art with the present invention as described herein.

SUMMARY

In one set of embodiments, display pipes in a graphics processing/display system may support user interface units that include registers programmable to define active regions of a frame, where pixels within the active regions of the frame are to be displayed and pixels outside of the active regions of the frame are not to be displayed. The interface units may fetch frames from memory by fetching only the pixels within the active regions of the frame as defined by the programmed contents of the registers. The user interface unit may provide the fetched pixels to a blend unit to blend the fetched pixels with pixels from other frames and/or pixels from a video stream to produce output frames for display. The pixels outside the active regions may be treated as having an Alpha value of zero for blending (in other words, having a blending value of zero), resulting in those pixels having no effect on the resulting output frames that are displayed.

In one set embodiments, the user interface unit may fill non-active regions of the frame with pixels identified as being transparent, that is, pixels having an Alpha value of zero, and provide the entire frame to the blend unit including the fetched pixels. In other embodiments, the blend unit may only receive the fetched pixels from the interface unit, and treat areas outside the active region as if they included pixels having an Alpha value of zero. The registers within the interface unit may also be programmed with other information pertaining to the image frames, for example a base address and size of the frame, among others. The user interface unit may also have built in scalers. Scaling, or upscaling may include determining a color for a given output pixel based on a corresponding input pixel quad. More generally, the scalers may be upscalers that use a specified number of context pixels or source pixels to generate each output pixel. In some embodiments the upscaled pixels may be generated based on a bilinear scaling algorithm, and the source pixels may be in the form of a pixel quad, or 2×2 grid of pixels. In the absence of active regions, that is, when an entire frame is to be fetched, all the source pixels used in generating an output pixel are available to the scaler(s).

With active regions, however, pixels outside the active region are not fetched, and the non-fetched pixels may be assumed to have an Alpha value of '0' (as mentioned above). Therefore, pixels at the edge of the active region may have some neighboring pixels outside the active region, and such pixels (considered transparent) may not provide accurate scaling. In one set of embodiments, when active regions are present, the scaler within the interface unit may identify a pixel grid for generating a given output pixel, and may further identify the non-fetched pixels (i.e. the pixels outside the active region) within the pixel grid. The scaler may then determine (desired) color values for the missing pixels based on the available pixels in the pixel grid (i.e. those pixels in the pixel grid that are within the active region), and use the determined color values to perform the scaling. A color determined by the scaler for the same pixel position within the non-active region may be different depending on the relative position of the missing pixel within the pixel grid (e.g. pixel quad) based on which a given pixel is generated. In other words, the same missing pixels may appear in different sets of context pixels (i.e. in different pixel grids), so the same pixel (position) within the non-active region may have different values assigned to it by the scaler depending on which pixel grid the inactive pixel appears in, even though it is the same inactive pixel.

In one set of embodiments, a bilinear upscaler in a user interface may use a 2×2 grid of source pixels to generate each output pixel. When using active regions, some source pixels may be inactive (i.e. not fetched), and the color (e.g. RGB) values for these pixels may be generated based on available active pixels for performing the scaling. That is, the other—available, i.e. active—pixels in the 2×2 grid may be used to generate the color values for the inactive pixels in the 2×2 grid. This may be applied to formats that don't feature pre-multiplied Alpha values. For example, the color values of inactive pre-multiplied source pixels may be specified to be zero (0). In addition, an inactive pixel's Alpha value may be specified to be zero, excluding pre-multiplied source pixels, which may have no Alpha values. In one embodiment, the color value for any given inactive pixel in a 2×2 grid (that is, the color value for any given pixel that is outside the active region and is included in the 2×2 grid) may be determined based on a specified set of rules. If both the vertically and horizontally adjacent pixels to the inactive pixel in the 2×2 grid are active, the inactive pixel's color values may be set to the average color values of the vertically and horizontally adjacent pixels. If only one of the adjacent pixels to the inactive pixel in the 2×2 grid is active, the inactive pixel's color values may be set to adjacent pixel's color values. If neither adjacent pixel to the inactive pixel in the 2×2 grid is active but the diagonal pixel to the inactive pixel is active, the inactive pixel's color values may be set to the diagonal pixel's color value. Finally, if there are no active pixels in the 2×2 grid, the color values of the inactive pixel may simply be set to zero (0).

BRIEF DESCRIPTION OF THE DRAWINGS

The following detailed description makes reference to the accompanying drawings, which are now briefly described.

Figure 1:
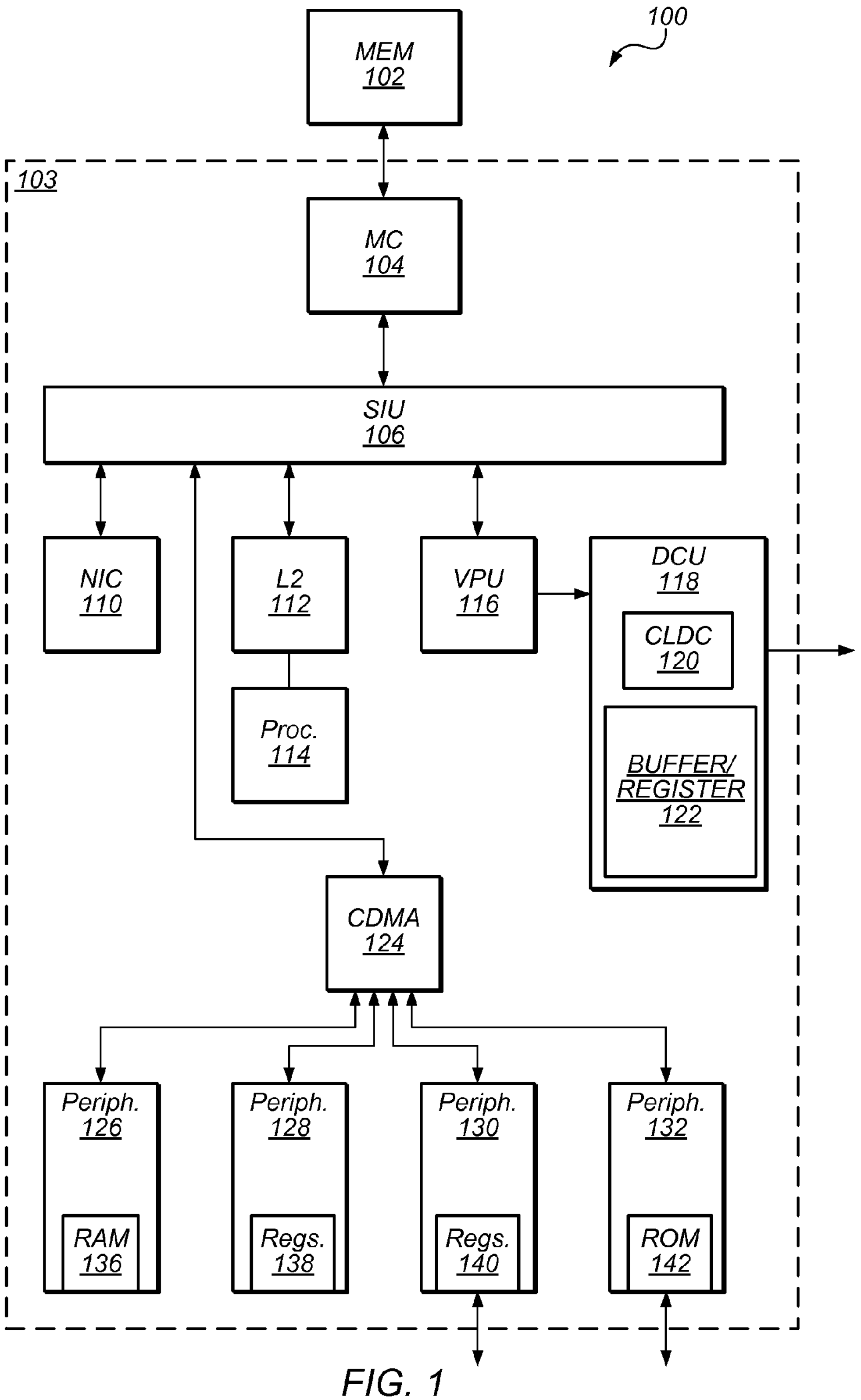
FIG. 1 is a block diagram of one embodiment of an integrated circuit that include a graphics display system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

As used herein, the term "adjacent" is used to denote a pixel's or pixels' relative position with respect to other pixels. A given pixel is said to be adjacent to another pixel if a side and/or a corner of the given pixel touches a side and/or a corner of the other pixel. Thus, for example, when all pixels have the same shape, and all pixels are aligned both horizontally and vertically, a pixel may be adjacent to at most eight other pixels. When all the pixels have the same shape, and are aligned horizontally but not vertically, or they are aligned vertically but not horizontally, a given pixel may be adjacent to at most a number of pixels different from eight (for example, the given pixel may be adjacent to at most 6 pixels), and so on and so forth.

Turning now to FIG. 1, a block diagram of one embodiment of a system 100 that includes an integrated circuit 103 coupled to external memory 102 is shown. In the illustrated embodiment, integrated circuit 103 includes a memory controller 104, a system interface unit (SIU) 106, a set of peripheral components such as components 126-128, a central DMA (CDMA) controller 124, a network interface controller (NIC) 110, a processor 114 with a level 2 (L2) cache 112, and a video processing unit (VPU) 116 coupled to a display control unit (DCU) 118. One or more of the peripheral components may include memories, such as random access memory (RAM) 136 in peripheral component 126 and read-only memory (ROM) 142 in peripheral component 132. One or more peripheral components 126-132 may also include registers (e.g. registers 138 in peripheral component 128 and registers 140 in peripheral component 130 in FIG. 1). Memory controller 104 is coupled to a memory interface, which may couple to memory 102, and is also coupled to SIU 106. CDMA controller 124, and L2 cache 112 are also coupled to SIU 106 in the illustrated embodiment. L2 cache 112 is coupled to processor 114, and CDMA controller 124 is coupled to peripheral components 126-132. One or more peripheral components 126-132, such as peripheral components 140 and 142, may be coupled to external interfaces as well.

SIU 106 may be an interconnect over which the memory controller 104, peripheral components NIC 110 and VPU 116, processor 114 (through L2 cache 112), L2 cache 112, and CDMA controller 124 may communicate. SIU 106 may implement any type of interconnect (e.g. a bus, a packet interface, point to point links, etc.). SIU 106 may be a hierarchy of interconnects, in some embodiments. CDMA controller 124 may be configured to perform DMA operations between memory 102 and/or various peripheral components 126-132. NIC 110 and VPU 116 may be coupled to SIU 106 directly and may perform their own data transfers to/from memory 102, as needed. NIC 110 and VPU 116 may include their own DMA controllers, for example. In other embodiments, NIC 110 and VPU 116 may also perform transfers through CDMA controller 124. Various embodiments may include any number of peripheral components coupled through the CDMA controller 124 and/or directly to the SIU 106. DCU 118 may include a display control unit (CLDC) 120 and buffers/registers 122. CLDC 120 may provide image/video data to a display, such as a liquid crystal display (LCD), for example. DCU 118 may receive the image/video data from VPU 116, which may obtain image/video frame information from memory 102 as required, to produce the image/video data for display, provided to DCU 118.

Processor 114 (and more particularly, instructions executed by processor 114) may program CDMA controller 124 to perform DMA operations. Various embodiments may program CDMA controller 124 in various ways. For example, DMA descriptors may be written to the memory 102, describing the DMA operations to be performed, and CDMA controller 124 may include registers that are programmable to locate the DMA descriptors in the memory 102. The DMA descriptors may include data indicating the source and target of the DMA operation, where the DMA operation transfers data from the source to the target. The size of the DMA transfer (e.g. number of bytes) may be indicated in the descriptor. Termination handling (e.g. interrupt the processor, write the descriptor to indicate termination, etc.) may be specified in the descriptor. Multiple descriptors may be created for a DMA channel, and the DMA operations described in the descriptors may be performed as specified. Alternatively, the CDMA controller 124 may include registers that are programmable to describe the DMA operations to be performed, and programming the CDMA controller 124 may include writing the registers.

Generally, a DMA operation may be a transfer of data from a source to a target that is performed by hardware separate from a processor that executes instructions. The hardware may be programmed using instructions executed by the processor, but the transfer itself is performed by the hardware independent of instruction execution in the processor. At least one of the source and target may be a memory. The memory may be the system memory (e.g. the memory 102), or may be an internal memory in the integrated circuit 103, in some embodiments. For example, a peripheral component 126-132 may include a memory that may be a source or target. In the illustrated embodiment, peripheral component 132 includes the ROM 142 that may be a source of a DMA operation. Some DMA operations may have memory as a source and a target (e.g. a first memory region in memory 102 may store the data to be transferred and a second memory region may be the target to which the data may be transferred). Such DMA operations may be referred to as "memory-to-memory" DMA operations or copy operations. Other DMA operations may have a peripheral component as a source or target. The peripheral component may be coupled to an external interface on which the DMA data is to be transferred or on which the DMA data is to be received. For example, peripheral components 130 and 132 may be coupled to interfaces onto which DMA data is to be transferred or on which the DMA data is to be received.

CDMA controller 124 may support multiple DMA channels. Each DMA channel may be programmable to perform a DMA via a descriptor, and the DMA operations on the DMA channels may proceed in parallel. Generally, a DMA channel may be a logical transfer path from a source to a target. Each channel may be logically independent of other DMA channels. That is, the transfer of data on one channel may not logically depend on the transfer of data on another channel. If two or more DMA channels are programmed with DMA operations, CDMA controller 124 may be configured to perform the transfers concurrently. For example, CDMA controller 124 may alternate reading portions of the data from the source of each DMA operation and writing the portions to the targets. CDMA controller 124 may transfer a cache block of data at a time, alternating channels between cache blocks, or may transfer other sizes such as a word (e.g. 4 bytes or 8 bytes) at a time and alternate between words. Any mechanism for supporting multiple DMA operations proceeding concurrently may be used.

CDMA controller 124 may include buffers to store data that is being transferred from a source to a destination, although the buffers may only be used for transitory storage. Thus, a DMA operation may include CDMA controller 124 reading data from the source and writing data to the destination. The data may thus flow through the CDMA controller 124 as part of the DMA operation. Particularly, DMA data for a DMA read from memory 124 may flow through memory controller 104, over SIU 106, through CDMA controller 124, to peripheral components 126-132, NIC 110, and VPU 116 (and possibly on the interface to which the peripheral component is coupled, if applicable). Data for a DMA write to memory may flow in the opposite direction. DMA read/write operations to internal memories may flow from peripheral components 126-132, NIC 110, and VPU 116 over SIU 106 as needed, through CDMA controller 124, to the other peripheral components (including NIC 110 and VPU 116) that may be involved in the DMA operation.

In one embodiment, instructions executed by the processor 114 may also communicate with one or more of peripheral components 126-132, NIC 110, VPU 116, and/or the various memories such as memory 102, or ROM 142 using read and/or write operations referred to as programmed input/output (PIO) operations. The PIO operations may have an address that is mapped by integrated circuit 103 to a peripheral component 126-132, NIC 110, or VPU 116 (and more particularly, to a register or other readable/writeable resource, such as ROM 142 or Registers 138 in the component, for example). It should also be noted, that while not explicitly shown in FIG. 1, NIC 110 and VPU 116 may also include registers or other readable/writeable resources which may be involved in PIO operations. PIO operations directed to memory 102 may have an address that is mapped by integrated circuit 103 to memory 102. Alternatively, the PIO operation may be transmitted by processor 114 in a fashion that is distinguishable from memory read/write operations (e.g. using a different command encoding then memory read/write operations on SIU 106, using a sideband signal or control signal to indicate memory vs. PIO, etc.). The PIO transmission may still include the address, which may identify the peripheral component 126-132, NIC 110, or VPU 116

(and the addressed resource) or memory 102 within a PIO address space, for such implementations.

In one embodiment, PIO operations may use the same interconnect as CDMA controller 124, and may flow through CDMA controller 124, for peripheral components that are coupled to CDMA controller 124. Thus, a PIO operation may be issued by processor 114 onto SIU 106 (through L2 cache 112, in this embodiment), to CDMA controller 124, and to the targeted peripheral component. Alternatively, the peripheral components 126-132 may be coupled to SIU 106 (much like NIC 110 and VPU 116) for PIO communications. PIO operations to peripheral components 126-132 may flow to the components directly from SIU 106 (i.e. not through CDMA controller 124) in one embodiment.

Generally, a peripheral component may comprise any desired circuitry to be included on integrated circuit 103 with the processor. A peripheral component may have a defined functionality and interface by which other components of integrated circuit 103 may communicate with the peripheral component. For example, a peripheral component such as VPU 116 may include video components such as a display pipe, which may include graphics processors, and a peripheral such as DCU 118 may include other video components such as display controller circuitry. NIC 110 may include networking components such as an Ethernet media access controller (MAC) or a wireless fidelity (WiFi) controller. Other peripherals may include audio components such as digital signal processors, mixers, etc., controllers to communicate on various interfaces such as universal serial bus (USB), peripheral component interconnect (PCI) or its variants such as PCI express (PCIe), serial peripheral interface (SPI), flash memory interface, etc.

As mentioned previously, one or more of the peripheral components 126-132, NIC 110 and VPU 116 may include registers (e.g. registers 138-140 as shown, but also registers, not shown, in NIC 110 and/or within VPU 116) that may be addressable via PIO operations. The registers may include configuration registers that configure programmable options of the peripheral components (e.g. programmable options for video and image processing in VPU 116), status registers that may be read to indicate status of the peripheral components, etc. Similarly, peripheral components may include memories such as ROM 142. ROMs may store data used by the peripheral that does not change, code to be executed by an embedded processor within the peripheral component 126-132, etc.

Memory controller 104 may be configured to receive memory requests from system interface unit 106. Memory controller 104 may be configured to access memory to complete the requests (writing received data to the memory for a write request, or providing data from memory 102 in response to a read request) using the interface defined the attached memory 102. Memory controller 104 may be configured to interface with any type of memory 102, such as dynamic random access memory (DRAM), synchronous DRAM (SDRAM), double data rate (DDR, DDR2, DDR3, etc.) SDRAM, Low Power DDR2 (LPDDR2) SDRAM, RAMBUS DRAM (RDRAM), static RAM (SRAM), etc. The memory may be arranged as multiple banks of memory, such as dual inline memory modules (DIMMs), single inline memory modules (SIMMs), etc. In one embodiment, one or more memory chips are attached to the integrated circuit 10 in a package on package (POP) or chip-on-chip (COC) configuration.

It is noted that other embodiments may include other combinations of components, including subsets or supersets of the components shown in FIG. 1 and/or other components. While one instance of a given component may be shown in FIG. 1, other embodiments may include one or more instances of the given component.

Figure 2:
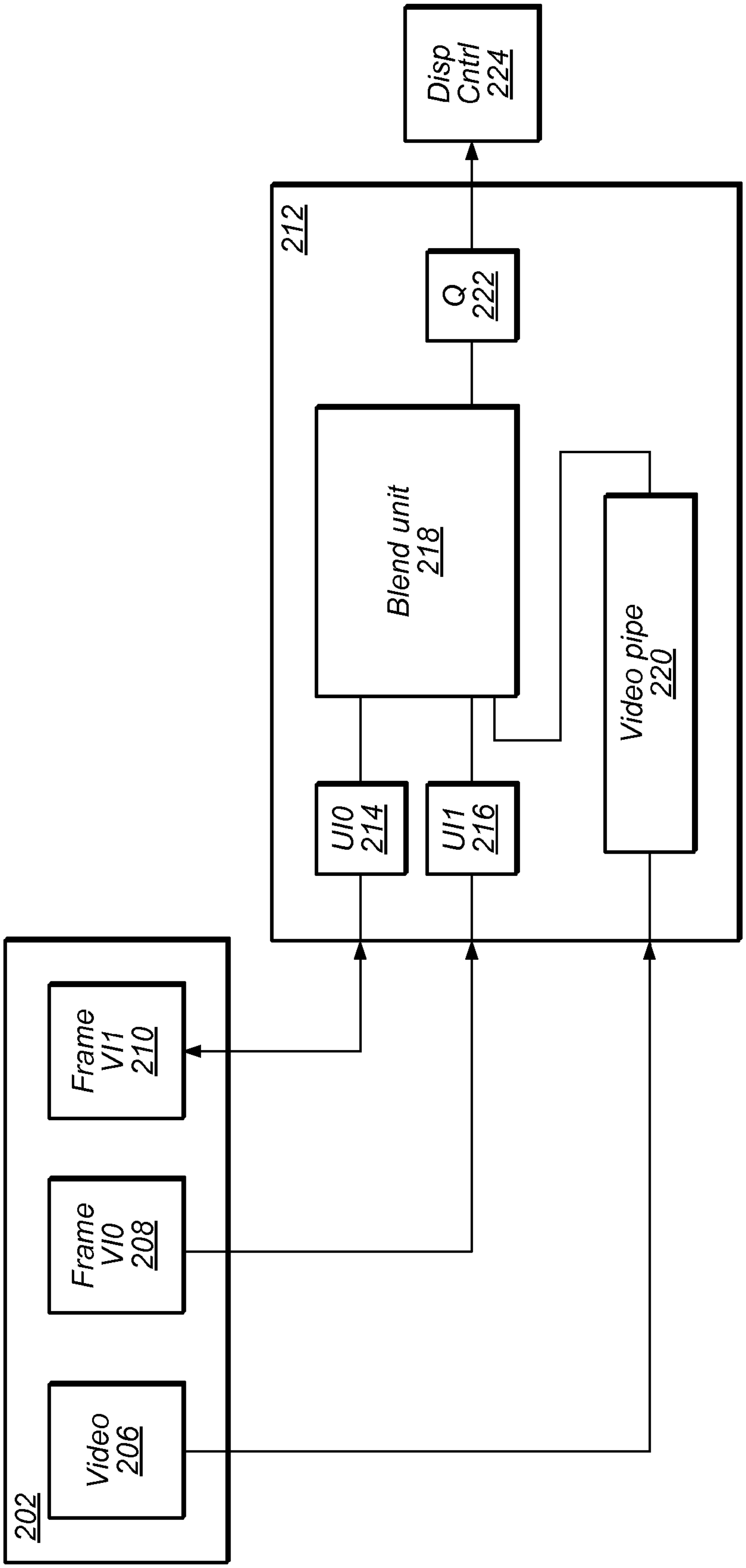
FIG. 2 is a block diagram of one embodiment of a graphics display system including system memory.

Turning now to FIG. 2, a partial block diagram is shown providing an overview of an exemplary system in which image frame information may be stored in memory 202, which may be system memory, and provided to a display pipe 212. As shown in FIG. 2, memory 202 may include a video buffer 206 for storing video frames/information, and one or more (in the embodiment shown, a total of two) image frame buffers 208 and 210 for storing image frame information. In some embodiments, the video frames/information stored in video buffer 206 may be represented in a first color space, according the origin of the video information. For example, the video information may be represented in the YCbCr color space. At the same time, the image frame information stored in image frame buffers 208 and 210 may be represented in a second color space, according to the preferred operating mode of display pipe 212. For example, the image frame information stored in image frame buffers 208 and 210 may be represented in the RGB color space. Display pipe 212 may include one or more user interface (UI) units, shown as UI 214 and 216 in the embodiment of FIG. 2, which may be coupled to memory 202 from where they may fetch the image frame data/information. A video pipe or processor 220 may be similarly configured to fetch the video data from memory 202, more specifically from video buffer 206, and perform various operations on the video data. UI 214 and 216, and video pipe 220 may respectively provide the fetched image frame information and video image information to a blend unit 218 to generate output frames that may be stored in a buffer 222, from which they may be provided to a display controller 224 for display on a display device (not shown), for example an LCD.

In one set of embodiments, UI 214 and 216 may include one or more registers programmable to define at least one active region per frame stored in buffers 208 and 210. Active regions may represent those regions within an image frame that contain pixels that are to be displayed, while pixels outside of the active region of the frame are not to be displayed. In order to reduce the number of accesses that may be required to fetch pixels from frame buffers 208 and 210, when fetching frames from memory 202 (more specifically from frame buffers 208 and 210), UI 214 and 216 may fetch only those pixels of any given frame that are within the active regions of the frame, as defined by the contents of the registers within UI 214 and 216. The pixels outside the active regions of the frame may be considered to have an Alpha value corresponding to a blend value of zero. In other words, pixels outside the active regions of a frame may automatically be treated as being transparent, or having an opacity of zero, thus having no effect on the resulting display frame. Consequently, the fetched pixels may be blended with pixels from other frames, and/or from processed video frame or frames provided by video pipe 220 to blend unit 218.

Figure 3:
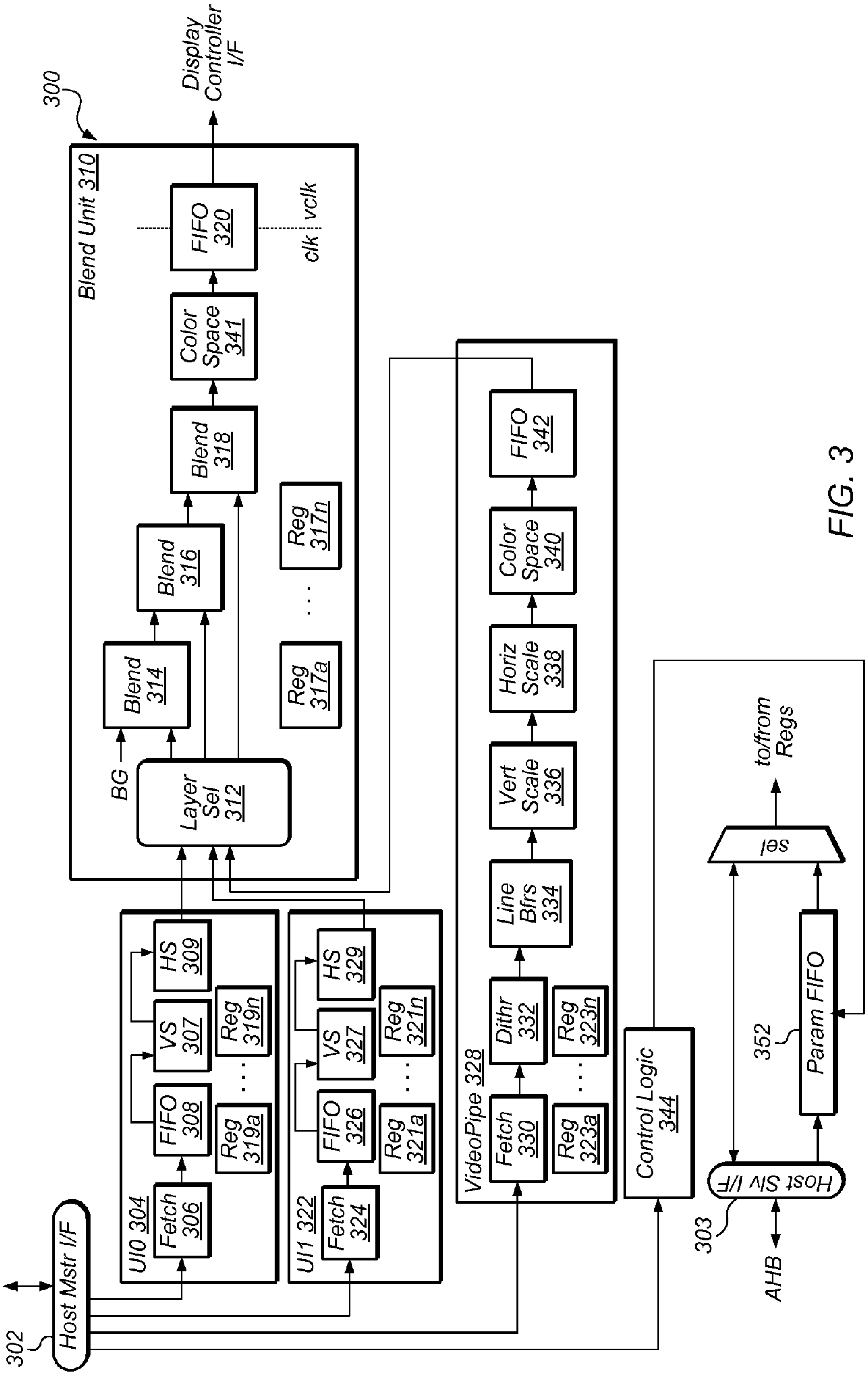
FIG. 3 is a block diagram of one embodiment of a display pipe in a graphics display system.

Turning now to FIG. 3, a more detailed logic diagram of one embodiment 300 of display pipe 212 is shown. In one set of embodiments, display pipe 300 may function to deliver graphics and video data residing in memory (or some addressable form of memory, e.g. memory 202 in FIG. 2) to a display controller or controllers that may support both LCD and analog/digital TV displays. The video data, which may be represented in a first color space, likely the YCbCr color space, may be dithered, scaled, converted to a second color space (for example the RGB color space) for use in blend unit 310, and blended with up to a specified number (e.g. 2) of graphics (user interface) planes that are also represented in the second (i.e. RGB) color space. Display pipe 300 may run in its own clock domain, and may provide an asynchronous interface to the display controllers to support displays of different sizes and timing requirements. Display pipe 300 may include one or more (in this case two) user interface (UI) blocks 304 and 322 (which may correspond to UI 214 and 216 of FIG. 2), a blend unit 310 (which may correspond to blend unit 218 of FIG. 2), a video pipe 328 (which may correspond to video pipe 220 of FIG. 2), a parameter FIFO 352, and Master and Slave Host Interfaces 302 and 303, respectively. The blocks shown in the embodiment of FIG. 3 may be modular, such that with some redesign, user interfaces and video pipes may be added or removed, or host master or slave interfaces 302 and 303 may be changed, for example.

Display pipe 300 may be designed to fetch data from memory, process that data, then presents it to an external display controller through an asynchronous FIFO 320. The display controller may control the timing of the display through a Vertical Blanking Interval (VBI) signal that may be activated at the beginning of each vertical blanking interval. This signal may cause display pipe 300 to initialize (Restart) and start (Go) the processing for a frame (more specifically, for the pixels within the frame). Between initializing and starting, configuration parameters unique to that frame may be modified. Any parameters not modified may retain their value from the previous frame. As the pixels are processed and put into output FIFO 320, the display controller may issue signals (referred to as pop signals) to remove the pixels at the display controller's clock frequency (indicated as vclk in FIG. 3).

In the embodiment shown in FIG. 3, each UI unit may include one or more registers 319*a*-319*n* and 321*a*-321*n*, respectively, to hold image frame information that may include active region information, base address information, and/or frame size information among others. Each UI unit may also include a respective fetch unit, 306 and 324, respectively, which may operate to fetch the frame information, or more specifically the pixels contained in a given frame from memory, through host master interface 302. In one set of embodiments, fetch units 306 and 324 may only fetch those pixels of any given frame that are within the active region of the given frame, as defined by the contents of registers 319*a*-319*n* and 321*a*-321*n*. The fetched pixels may be fed to respective FIFO buffers 308 and 326, from which the UI units may perform scaling operations for the fetched pixels. As shown in FIG. 3, UI unit 304 may include vertical scaler 307 and horizontal scaler 309, and UI unit 322 may include vertical scaler 327 and horizontal scaler 329, which may perform vertical and horizontal scaling, respectively, on the fetched pixels stored in FIFO 308 and FIFO 326. Scaling for each pixel may include determining a color for a given pixel based on a grid of pixels, which may in effect be a pixel quad, as will be further described below. UI units 304 and 322 may provide the scaled pixels, or output pixels generated from the fetched pixels by scalers 307 and 309, and 327 and 329, respectively, to blend unit 310, more specifically to a layer select unit 312 within blend unit 310. Blend unit 310 may then blend the fetched pixels obtained from UI 304 and 322 with pixels from other frames and/or video pixels obtained from video pipe 328. The pixels may be blended in blend elements 314, 316, and 318 to produce an output frame or output frames, which may then be passed to FIFO 320 to be retrieved by a display controller interface coupling to FIFO 320, to be displayed on a display of choice, for example an LCD.

The overall operation of blend unit 310 will now be described. Blend unit 310 may be situated at the backend of display pipe 300 as shown in FIG. 3. It may receive frames of pixels represented in a second color space (e.g. RGB) from UI 304 and 322, and pixels represented in a first color space (e.g. YCbCr) from video pipe 328, and may blend them together layer by layer, through layer select unit 312, once the pixels obtained from video pipe 328 have been converted to the second color space, as will be further described below. The final resultant pixels (which may be RGB of 10-bits each) may be converted to the first color space through color space converter unit 341 (as will also be further described below), queued up in output FIFO 320 at the video pipe's clock rate of clk, and fetched by a display controller at the display controller's clock rate of vclk. It should be noted that while FIFO 320 is shown inside blend unit 310, in alternative embodiments, FIFO 320 may be positioned outside blend unit 310 and possibly within a display controller unit. In addition, while color space conversion by converter unit 341 is shown to take place prior to providing the resultant pixels to FIFO 320, in alternate embodiments the color conversion may be performed on the data fetched from FIFO 320.

The sources to blend unit 310 (UI 304 and 326, and/or video pipe 328) may provide the pixel data and per-pixel Alpha values (which may be 8-bit and define the transparency for the given pixel) for an entire frame with width, display width, and height, display height, in pixels starting at a specified default pixel location, (e.g. 0,0). Blend unit 310 may functionally operate on a single layer at a time. The lowest level layer may be defined as the background color (BG, provided to blend element 314). Layer 1 may blend with layer 0 (at blend element 316). The next layer, layer 2, may blend with the output from blend element 316 (at blend element 318), and so on until all the layers are blended. For the sake of simplicity, only three blend elements 314-318 are shown, but display pipe 300 may include more or less blend elements depending on the desired number of processed layers. Each layer (starting with layer 1) may specify where its source comes from to ensure that any source may be programmatically selected to be on any layer. As mentioned above, as shown, blend unit 310 has three sources (UI 304 and 322, and video pipe 328) to be selected onto three layers (using blend elements 314-318). A CRC (cyclic redundancy check), or more generally, an error check may also be performed on the output of blend unit 310, or more specifically, on the output to be provided to FIFO 320. Blend unit 310 may also be put into a CRC only mode, in which case only a CRC is performed on the output pixels without the output pixels being provided to FIFO 320, and without sending the output pixels to the display controller.

Each source (UI 304 and 322, and video pipe 328) may provide a per pixel Alpha value. The Alpha values may be used to perform per-pixel blending, may be overridden with a static per-frame Alpha value (e.g. saturated Alpha), or may be combined with a static per-frame Alpha value (e.g. Dissolve Alpha). Any pixel locations outside of a source's valid region may not be used in the blending. The layer underneath it may show through as if that pixel location had an Alpha of zero. An Alpha of zero for a given pixel may indicate that the given pixel is invisible, and will not be displayed.

In one set of embodiments, valid source regions, referred to as active regions may be defined as the area within a frame that contains valid pixel data. Pixel data for an active region may be fetched from memory by UI 304 and 322, and stored within FIFOs 308 and 326, respectively, and subsequently scaled vertically (via VS units 307 and 327, respectively), and horizontally (via HS units 309 and 329, respectively), prior to being provided to blend unit 310. An active region may be specified by starting and ending (X,Y) offsets from an upper left corner (0,0) of the entire frame. The starting offsets may define the upper left corner of the active region, and the ending offsets may define the pixel location after the lower right corner of the active region. Any pixel at a location with coordinates greater than or equal to the starting offset and less than the ending offset may be considered to be in the valid region. Any number of active regions may be specified. For example, in one set of embodiments there may be up to four active regions defined within each frame and may be specified by region enable bits. The starting and ending offsets may be aligned to any pixel location. An entire frame containing the active regions may be sent to blend unit 310. Any pixels in the frame, but not in any active region would not be displayed, and may therefore not participate in the blending operation, as if the pixels outside of the active had an Alpha value of zero. In alternate embodiments, blend unit 310 may be designed to receive pixel data for only the active regions of the frame instead of receiving the entire frame, and automatically treat the areas within the frame for which it did not receive pixels as if it had received pixels having a blending value (Alpha value) of zero.

In one set of embodiments, one active region may be defined within UI 304 (in registers 319*a*-319*n*) and/or within UI 322 (in registers 321*a*-321*n*), and may be relocated within the display destination frame. Similar to how active regions within a frame may be defined, the frame may be defined by the pixel and addressing formats, but only one active region may be specified. This active region may be relocated within the destination frame by providing an X and Y pixel offset within that frame. The one active region and the destination position may be aligned to any pixel location. It should be noted that other embodiments may equally include a combination of multiple active regions being specified by storing information defining the multiple active regions in registers 319*a*-319*n* and in registers 321*a*-321*n*, and designating one or more of these active regions as active regions that may be relocated within the destination frame as described above. In some embodiments, UI units 304 and 322 may fetch image frame data in various formats, convert it to a specific color space format in which the blending may take place (e.g. RGBA—10-bit each sample), scale (e.g. up-scale) the frame, and stage the samples before being sent to blend unit 310 to be blended with other user interface planes and video data. For each UI (e.g. 304 and 322), a source frame in memory may be defined as a scale region inside of a source buffer using a base address, stride, and source width, height, and X/Y offset in pixels. To reduce memory bandwidth, a maximum number of active regions (pixel resolution) may be specified within the scale region—e.g. up to 4 active regions. Only the pixels within the active regions may be fetched, as previously indicated. This scale region may be possibly scaled, cropped, and/or extended to create a destination region that may be placed anywhere in the destination frame, specified by the pixel X/Y position.

Figure 4:
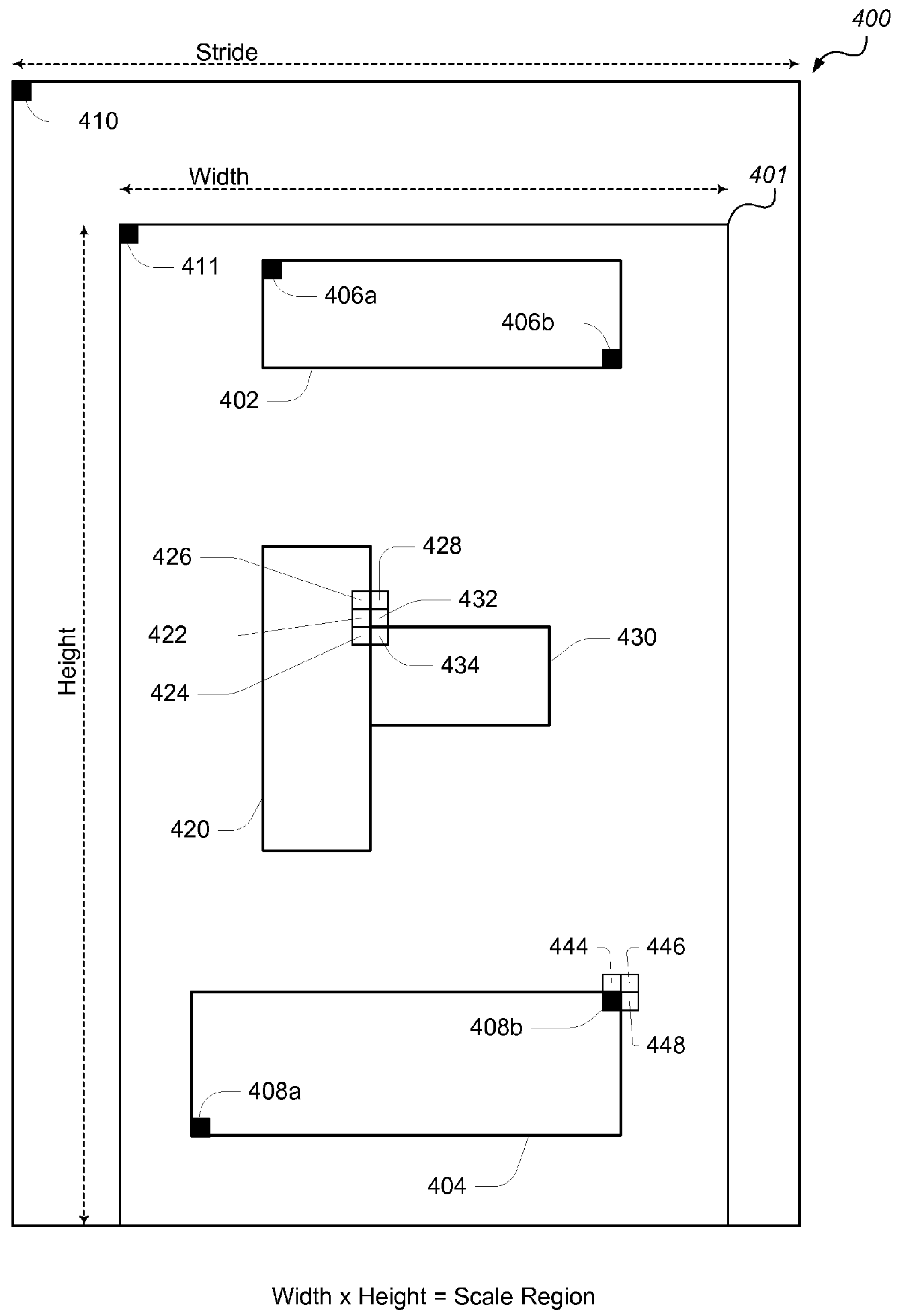
FIG. 4 is an illustration of one example of an image frame containing active regions.

Turning now to FIG. 4, an example drawing is provided of a frame 401 situated within a source buffer 400, with frame 401 including four active regions 402, 420, 430, and 404. As previously mentioned, UI active regions may be defined as the area within the UI scale region that contains the valid pixel data, and any number of active regions within a frame may be defined, though only four active regions are defined in example frame 400. An upper left corner pixel 410 of frame buffer 400 may be defined as a (0,0) coordinate position, based on which active regions 402, 420, 430, and 404 may be defined. For example, active region 402 may be defined based on pixels 406*a* and 406*b*, defining the upper left corner and lower right corner, respectively, of active region 402. Similarly, active region 404 may be defined based on pixels 408*a* and 408*b*, defining the lower left corner and upper right corner, respectively, of active region 404. Overall, any two corners situated diametrically opposite each other within an active region may be used to define the active region. The position of the active region may then be defined by providing offset values for pixels 406*a* and 406*b*, and offset values for pixels 408*a* and 408*b* from any specified reference point of the frame, for example from the (0,0) position.

The principles exemplified above may be further expressed as follows. As shown in FIG. 4, a source frame 401 in memory may be defined as a scale region (401) inside of a source buffer 400 using a base address 410, stride, source width and height, and X/Y offset 411 in pixels. Valid active regions may be within the scale region 401 and may be specified by starting and ending (X/Y) offsets from the upper left corner (base address 410) of the source buffer. The four active regions shown in FIG. 4 may each have respective starting offsets define one corner of the given active region, for example the upper left corner as mentioned above with respect to active region 402 (starting offset 406*a*). Some of the active regions may each have respective starting offsets define the lower left corner of the given active region, as mentioned above with respect to active region 404 (starting offset 408*a*). The ending offsets may define the pixel location after the corner diagonally opposite of the corner used for the starting offset of the active region, for example the pixel location after the lower right corner as shown with respect to active region 402 (ending offset 406*b*). Thus, in some embodiments, ending offsets may define the pixel location after the upper right corner of the active region as shown with respect to active region 404 (ending offset 408*b*). In case the starting offset defines the upper left corner of the active region, and the ending offset defines the pixel location after the lower right corner of the active region, any pixel at location (X,Y) where (starting X offset<=X<ending X offset), and (starting Y offset<=Y<ending Y offset) is considered to be in the Active region.

UI upscaling in both horizontal (X) and vertical (Y) directions may be provided for source scale region 401 (shown in FIG. 4), before being sent to blend unit 310 (shown in FIG. 3). Vertical scaling may be performed first (via VS 307 and VS 327 in UI 304 and UI 322, respectively, shown in FIG. 3), followed by horizontal scaling (via HS 309 and HS 329 in UI 304 and UI 322, respectively, shown in FIG. 3). In some embodiments, scaling may be accomplished through a bilinear filter with the weighting factors provided from a Digital Differential Analyzer (DDA). The amount of upscaling may be unlimited, but some embodiments using a bilinear filter may be designed to limit scaling to a factor of up to 2×. All components (e.g. RGBA) may be scaled separately, including scaling of the Alpha values. A DDA may control the current position during the scaling operation. In one embodiment, the DDA is a 36-bit register that contains a 2s-complement fixed-point number with 16 bits in the integer portion, and 20 bits in the fraction. For example, the DDA in each UI unit may be one of registers 319*a*-319*n* in UI 304, and one of registers 321*a*-321*n* in UI 322, for example. The 16-bit integer portion of the number in the DDA may determine which 2 pixels provide the inputs to filtering. The fractional portion may be used as the weighting factor in the bilinear filtering. The scaling operation may include initializing the DDA (this initial value referred to as DDAInit), performing the bilinear filtering using the integer and fractional portions of the DDA, adding a step value (this step value referred to as DDAStep) to the DDA, and repeating filtering and stepping. The amount of upscaling may be determined by the reciprocal value of the DDAStep. For example, a DDAStep of 0.5 may result in a 2× upscaling. The DDAInit value may be 32 bits, with 16 bits in the integer portion and 16 bits in the fraction portion. The DDA may be initialized with DDAInit by appending 4 bits of zero on the right side of the fraction portion. For the current 36-bit value of the DDA, the current pixel location (referred to as CurrPixel) may be defined by a specified portion of the DDA, for example by bits DDA[35:20]. The value of the CurrPixel position and the next pixel position (CurrPixel+1, referred to as NextPixel) may be used for the bilinear filtering. The current fraction, (referred to as CurrFrac) may be defined by a remaining portion of the DDA, for example by bits DDA[19:0], and may be used in the bilinear calculation. Both the vertical filter (VS 307 and VS 327) and horizontal filter (HS 309 and HS 329) in UI 304 and 322, respectively, may be operated according to the following equation, where the CurrPixel and CurrFrac are provided from the DDA:

$$\text{Output Pixel}=\text{Value}[\text{CurrPixel}]*(1-\text{CurrFrac})+\text{Value}[\text{CurrPixel}+1]*\text{CurrFrac}.$$

If CurrFrac is zero, then the Output Pixel is just the Value [CurrPixel]. The result of the scaling may be rounded and a 10-bit result provided to blend unit 310 (shown in FIG. 3).

The DDA indicates the CurrPixel and NextPixel (CurrPixel+1) positions. These pixel positions may be within an active region (e.g. one of active regions 402, 420, 430, and 404 shown in FIG. 4), outside of an active region but inside a scale region (e.g. scale region 401 shown in FIG. 4), or outside of the scale region (e.g. outside scale region 401 shown in FIG. 4). Scaling boundary cases occur when there is an active pixel at a boundary of an active region with a pixel not in the active region (i.e. with an inactive pixel). The inactive pixel may or may not be within the boundary of scale region 401. The inactive pixel may be processed according to three different cases during scaling. The active pixel may be treated using its real, i.e. actual value. The three cases may depend on whether blending for the given UI source is in a normal Alpha mode or a pre-multiplied Alpha mode. Also, a programmable condition may specify how the boundary of a scale region is treated, "Hard" or "Soft". In a first boundary case (case 0), the inactive pixel may take on the color component values of the active pixel, but the Alpha value of the inactive pixel may be zero. This may be used in normal Alpha mode at the boundaries of active regions, and "Soft" boundaries of scale regions. In a second boundary case (case 1), the inactive pixel may have color values and an Alpha value of zero. This may be used in pre-multiplied Alpha mode at the boundaries of active regions and "Soft" boundaries of scale regions. In a third boundary case (case 2), the inactive pixel may take on the color component values and the Alpha value of the active pixel. This may be used at "Hard" boundaries of scale regions. For both pixels outside of an active region, the resulting color (e.g. RGB) may not matter because the Alpha values of the current and next pixel are both 0, so the resulting Alpha value is also zero. In this case the color components may be set to zero.

Various examples of possible pixel positions are shown in FIG. 4, including pixels 422-428 and pixels 432-434, and pixels 408*b* and pixels 444-448. In one set of embodiments, the upscaler may be a bilinear upscaler and may use a 2×2 grid of source pixels to generate each output pixel. When using active regions, as shown in FIG. 4, some source pixels may be inactive (i.e. not fetched—e.g. pixels 428, 432, and 444-448), and the color (e.g. RGB) values for these pixels may be generated based on available pixels for performing the scaling (e.g. pixels 422-426 and 434, and 408*b*, respectively). That is, the other—available—pixels in the 2×2 grid may be used to generate the color values for the inactive pixels in the 2×2 grid. This may be applied to formats that don't feature pre-multiplied Alpha values. For example, the color values of inactive pre-multiplied source pixels may be specified to be zero (0). In addition, an inactive pixel's Alpha value may be specified to be zero, excluding pre-multiplied source pixels, which may have no Alpha values.

As previously mentioned, the UI scalers may generate the output pixels based on specified pixel grids. In some embodiments, each pixel grid may include four pixels, forming a 2×2 grid, referred to as a pixel quad. Examples of pixel quads are shown in FIG. 4. For example, pixels 422, 426, 428 and 432 may form a first pixel quad, pixels 422, 424, 432 and 434 may form a second pixel quad, and pixels 408*b*, 444, 446 and 448 may form a third pixel quad. As seen in these examples, some of the pixels in each given pixel quad is outside the active region. More specifically, pixels 428, 432, 444, 446, and 448 are shown to occupy a space within scale region 401 but outside active regions 420, 430, and 404, and are therefore inactive pixels. The color value for any given inactive pixel in a 2×2 grid (that is, the color value for any given pixel that is outside the active region and is included in the 2×2 grid, such as pixels 428, 432, 444, 446, and 448) may be determined according to the values of those pixels within the pixel quad that are within the active region (such as pixels 422, 424, 426, 434, and 408*b*). In other words, color values may be assigned to the inactive pixel(s) in the grid, based on the color values of the active pixel(s) within the grid (2×2 grid shown in FIG. 4), so that the scaler may then generate the output pixel based on the 2×2 pixel grid.

In one embodiment, the color value for any given inactive pixel in a 2×2 grid may be assigned as follows. If both the vertically and horizontally adjacent pixels to the inactive pixel in the 2×2 grid are active, as exemplified by the 2×2 pixel grid that includes pixels 422, 424, 432 and 434, the inactive pixel's color value may be set to the average color value of the vertically and horizontally adjacent pixels. That is, in the example case, the color value of pixel 432 may be set to the average color value of pixels 422 and 434. If only one of the adjacent pixels in the 2×2 grid is active, as exemplified by the 2×2 pixel grid that includes pixels 422, 426, 428 and 432, the inactive pixel's color value may be set to the adjacent pixel's color value. That is, in the example case, the color value of pixel 428 may be set to the color value of pixel 426, and the color value of pixel 432 may be set to the color value of pixel 422. If neither adjacent pixel in the 2×2 grid is active but the diagonal pixel is active, as exemplified by the 2×2 pixel grid that includes pixels 408*b*, 444, 446 and 448, the inactive pixel's color values may be set to the diagonal pixel's color value. That is, in the example case, the color value of pixel 446 may be set to the color value of pixel 408*b*. According to the previous examples, the color value of pixel 444 may also be set to the color value of pixel 408*b*, and the color value of pixel 448 may also be set to the color value of pixel 408*b*. Finally, if there are no active pixels in the 2×2 grid, the color value of the inactive pixel may be set to zero (0). Alternate embodiments may use different combinations, while still assigning color values to the inactive pixels based on the color values of the active pixels within the pixel grid, and the scaler may subsequently determine an output pixel value from the pixel grid, in which all pixels now have a proper color value, as previously shown.

In one set of embodiments, the active regions in a frame may represent graphics overlay to appear on top of another image or a video stream. For example, the active regions may represent a static image superimposed atop a video stream. In some embodiments, active regions may more generally represent an overlay window that may be used to superimpose any desired information atop information presented in the background layer underneath. For example, display pipe 212 may include more than one video pipe similar to video pipe 220 (or 328, as shown in FIG. 3), and overlay video information in the active region. Similarly, instead of a video stream, static images may be displayed underneath the active regions, and so forth. Referring again to FIG. 3, video pipe 328 may provide a video stream to blend unit 310, while UI 304 and 322 may provide image frames with pixels in the active region representing a static image overlay to be displayed atop the video stream. In this case, the output frames provided from FIFO 320 to the display controller may include video pixel information from video pipe 328, with the fetched pixels from HS 309 and/or 329 superimposed on top of the video pixel information, blended together by blend unit 310 according to the Alpha values and other pertinent characteristics of the fetched pixels. Again, different embodiments may include various combinations of video and static image information blended and displayed in a manner similar to what is shown in FIG. 4, with the functionality of the display pipe expanded accordingly with additional video pipes and/or user interfaces as needed. Blend unit 310 may similarly be expanded to accommodate the additional pixels that may need to be blended.

In one set of embodiments, using fetch unit 330, video pipe 328 may fetch video frame data/information from memory through host master interface 302. The video frame data/information may be represented in a given color space, for example YCbCr color space. Video pipe 328 may insert random noise (dither) into the samples (dither unit 332), and scale that data in both vertical and horizontal directions (scalers 336 and 338) after buffering the data (buffers 334). In some embodiments, blend unit 310 may expect video (pixel) data to be represented in a different color space than the original color space (which, as indicated above, may be the YCbCr color space). In other words, blend unit 310 may operate in a second color space, e.g. in the RGB color space. Therefore, the video frame data may be converted from the first color space, in this case the YCbCr color space, to the second color space, in this case the RGB color space, by color space converter unit 340. It should be noted that while color space converter unit 340 is shown situated within video pipe 328, it may be situated anywhere between the output provided by video pipe 328 and the input provided to blend unit 310, as long as the data that is ready to be provided to blend unit 310 has been converted from the first color space to the second color space prior to the data being processed and/or operated upon by blend unit 310.

The converted data (that is, data that is represented in the second color space, in this case in the RGB color space) may then be buffered (FIFO 342), before being provided to blend unit 310 to be blended with other planes represented in the second color space, as previously discussed. During the process of converting data represented in the first color space into data represented in the second color space, there may be some colors represented in the first (i.e. the YCbCr) color space that cannot be represented in the second (i.e. RGB) color space. For example, the conversion may yield an R, G, or B component value of greater than 1 or less than 0. Displaying videos on certain display devices may therefore yield different visual results than desired and/or expected. Therefore, in at least one set of embodiments, blend unit 310 may be designed to perform blending operations using the converted pixel values even when the converted pixel values do not represent valid pixel values in the second color space. For example, if the second color space (or the operating color space of blend unit 310) is the RGB color space, blend unit 310 may allow RGB values as high as +4 and as low as −4. Of course these values may be different, and may also depend on what the original color space is. While these values may not represent valid pixel values in the second (i.e. RGB) color space, they can be converted back to the correct values in the first (i.e. the YCbCr) color space. Accordingly, the color information from the original (YCbCr) color space may be maintained through video pipe 328, and may be displayed properly on all display devices that display the video frames.

Thus, before displaying the blended pixels output by blend element 318, the blended pixels may be converted from the second color space (i.e. RGB in this case) to the original video color space (i.e. the YCbCr color space in this case) through color space conversion unit 341. As was the case with video pipe 328, while color space conversion unit 341 is shown situated within blend unit 310 and between blend element 318 and FIFO 320, in alternate embodiments the color space conversion may be performed on the display controller side, prior to being provided to the display, and various other embodiments are not meant to be limited by the embodiment shown in FIG. 3.

In one set of embodiments, a parameter FIFO 352 may be used to store programming information for registers 319*a*-319*n*, 321*a*-321*n*, 317*a*-317*n*, and 323*a*-323*n*. Parameter FIFO 352 may be filled with this programming information by control logic 344, which may obtain the programming information from memory through host master interface 302. In some embodiments, parameter FIFO 352 may also be filled with the programming information through an advanced high-performance bus (AHB) via host slave interface 303.

Figure 5:
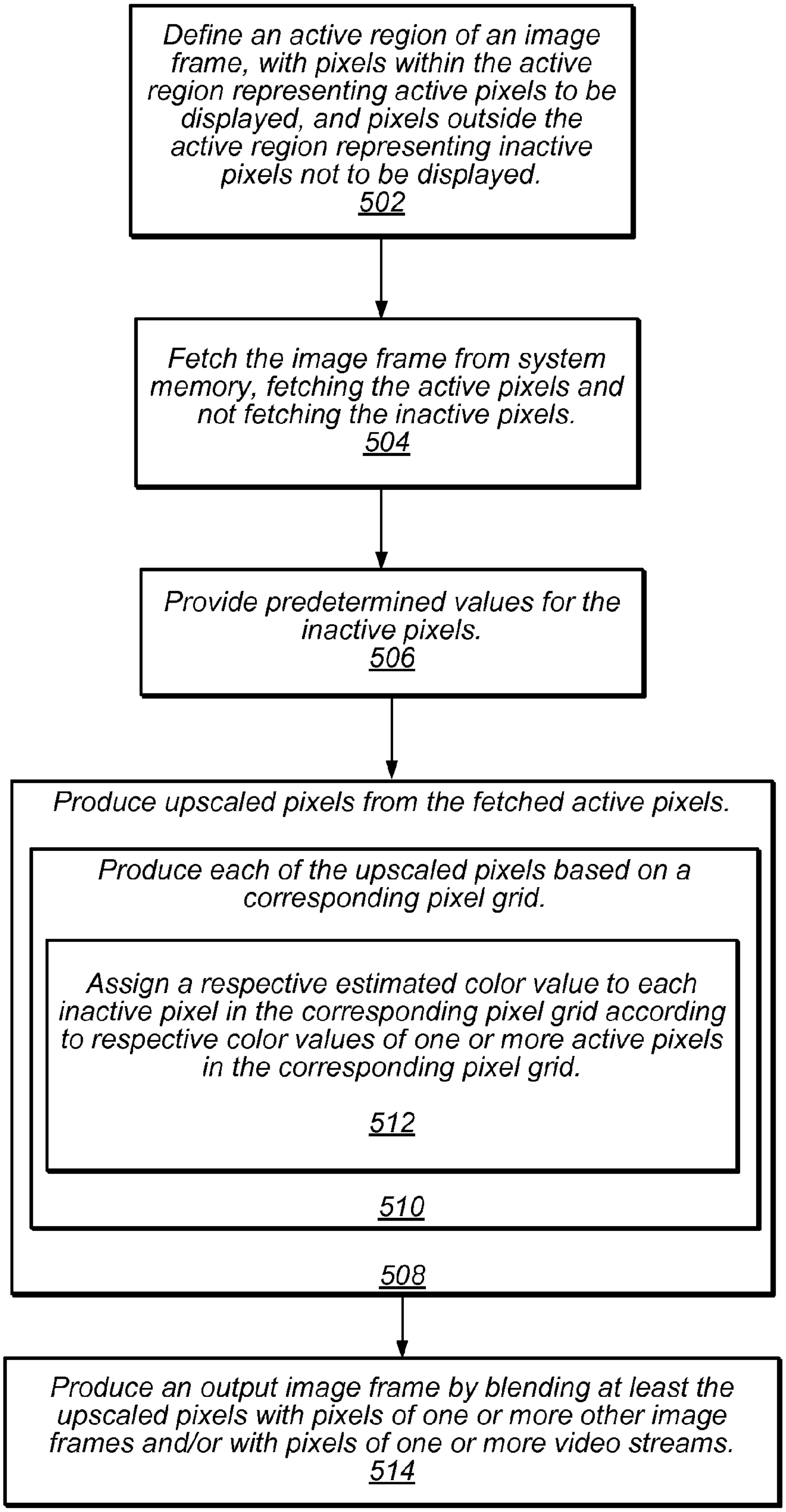
FIG. 5 is a flow chart illustrating a first embodiment of a method for processing image frames in a display pipe.

FIG. 5 shows a flowchart illustrating one embodiment of a method for processing image frames in a display pipe. Image frames in system memory may be accessible to a display pipe operated to process the image frames. An active region of an image frame may be defined, with pixels within the active region representing active pixels to be displayed, and pixels outside the active region representing inactive pixels not to be displayed (502). The image frame may be fetched from the system memory (e.g. by the display pipe) by fetching the active pixels and not fetching the inactive pixels (504). As the inactive pixels are not fetched, predetermined values may be provided for the inactive pixels (506). Upscaled pixels may then be produced from the fetched active pixels (508), which may be performed by producing each of the upscaled pixels based on a corresponding pixel grid (510). For example, the pixel grid may be a 2×2 pixel grid including at least one of the fetched active pixels. When an active pixel in the pixel grid is at the boundary of an active region, the pixel grid may also include inactive pixels. When this occurs, a respective estimated color value may be assigned to each inactive pixel in the corresponding pixel grid according to respective color values of one or more active pixels in the corresponding pixel grid (512). An output image frame may be produced by blending at least the upscaled pixels with pixels of one or more other image frames and/or with pixels of one or more video streams (514). The values of the pixels may be color values and alpha values, each component of the color value, and the alpha value processed separately.

Figure 6:
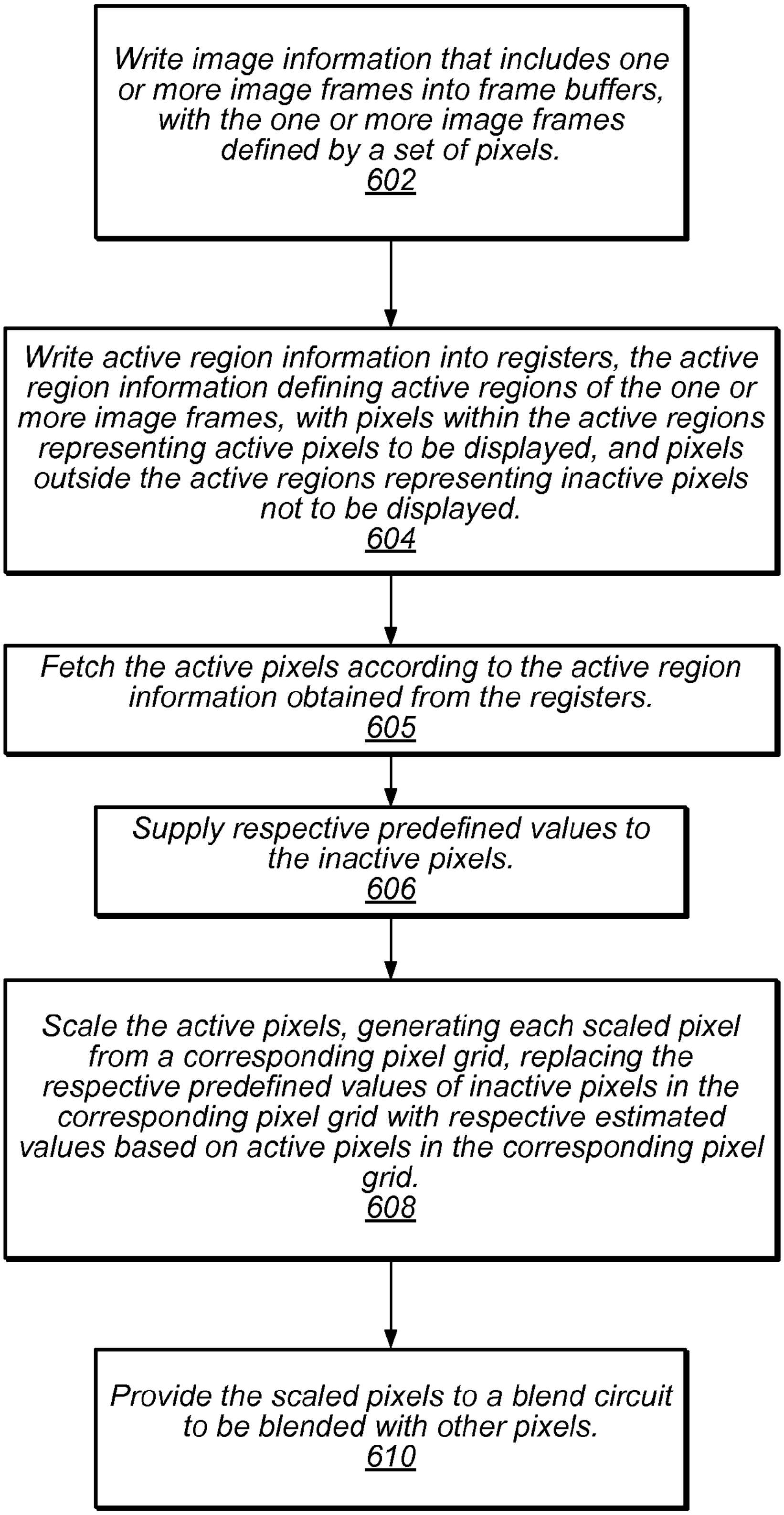
FIG. 6 is a flow chart illustrating a second embodiment of a method for processing image frames in a display pipe.

FIG. 6 shows a flowchart is shown illustrating another embodiment of a method for processing image frames in a graphics system. Image information that includes one or more image frames may be written into frame buffers, with the one or more image frames defined by a set of pixels (602). The frame buffers may be in system memory (e.g. memory 102 in FIG. 2), or any storage element configured in the graphics system. Active region information may be written into registers (e.g. registers 319*a-n* and/or registers 321*a-n* shown in FIG. 3), the active region information defining active regions of the one or more image frames, with pixels within the active regions representing active pixels to be displayed, and pixels outside the active regions representing inactive pixels not to be displayed (604). Examples of active regions are illustrated in FIG. 4. The active pixels may be fetched from the frame buffers, according to the active region information obtained from the registers (605). Respective predefined values may be supplied to the inactive pixels (606) to be later used in producing an output frame. The active pixels may be scaled, generating each scaled pixel from a corresponding pixel grid, replacing the respective predefined values of inactive pixels in the corresponding pixel grid with respective estimated values based on active pixels in the corresponding pixel grid (608). The corresponding pixel grid may include one or more inactive pixels when an active pixel in the corresponding pixel grid is situated at the boundary of the active region, as shown for example in FIG. 4. The scaled pixels may then be provided to a blend circuit to be blended with other pixels as required, or further processed as required (610).

Numerous variations and modifications will become apparent to those skilled in the art once the above disclosure is fully appreciated. It is intended that the following claims be interpreted to embrace all such variations and modifications.

We claim:

1. A user interface unit comprising:

a fetch unit configured to fetch, from memory, a frame to be displayed, wherein the frame comprises active pixels and inactive pixels, wherein to fetch the frame, the fetch unit is configured to fetch the active pixels of the frame from memory and not fetch the inactive pixels of the frame from memory, wherein the active pixels are within one or more active regions of the frame, and the inactive pixels are outside of the one or more active regions of the frame, wherein the active pixels of the frame are to be displayed and the inactive pixels of the frame are not to be displayed; and a scaler unit configured to:

produce scaled pixels for the fetched pixels, basing each scaled pixel on a respective corresponding set of pixels in the frame;

wherein to produce the scaled pixels when a first pixel in the respective corresponding set of pixels in the frame is an inactive pixel, the scaler unit is configured to generate an estimated pixel value corresponding to the first pixel based on one or more fetched active pixels of the respective corresponding set of pixels in the frame, wherein the estimated pixel value is included in the corresponding set of pixels in place of the first pixel; and output the scaled pixels for display.

2. The user interface unit as recited in claim 1, wherein the respective corresponding set of pixels includes at least one of the fetched pixels and a specified number of adjacent pixels that are adjacent to the at least one of the fetched pixels.

3. The user interface unit as recited in claim 1, wherein the scaler unit is configured to provide the scaled pixels to a blend unit configured to blend at least the scaled pixels with pixels from other frames to produce an output frame.

4. The user interface unit as recited in claim 1, further comprising one or more buffers coupled to the fetch unit;

wherein the fetch unit is further configured to store the fetched pixels in the one or more buffers;

wherein the user interface unit is configured to provide the fetched pixels to the scaler unit from the one or more buffers.

5. The user interface unit as recited in claim 1, wherein the fetch unit is further configured to supply the respective predefined values for the inactive pixels.

6. A display pipe comprising:

a host interface unit configured to interface with system memory; and a plurality of user interface units coupled to the host interface unit and configured to hold frame information defining respective active regions within a plurality of frames, wherein pixels within the respective active regions of each frame of the plurality of frames are active pixels to be displayed and pixels outside of the respective active regions of each frame of the plurality of frames are inactive pixels not to be displayed;

wherein each interface unit of the plurality of user interface units is configured to:

fetch from the system memory through the host interface unit one or more frames of the plurality of frames, wherein to fetch each given frame of the one or more frames, the user interface unit is configured to fetch the active pixels of the given frame from system memory;

generate output pixels for each given frame of the one or more frames, wherein each given output pixel of the output pixels is based on a respective corresponding pixel grid in the given frame, the respective corresponding pixel grid comprising a specified number of adjacent pixels that include at least one of the fetched pixels of the given frame;

wherein to generate the given output pixel for the given frame when a first pixel in the respective corresponding pixel grid is an inactive pixel, the interface unit is configured to generate an estimated pixel value corresponding to the first pixel based on one or more active pixels of the respective corresponding pixel grid, wherein the estimated pixel value is included in the respective corresponding pixel grid in place of the first pixel.

7. The display pipe as recited in claim 6, further comprising:

a blend unit coupled to the plurality of user interface units;

wherein the plurality of user interface units are configured to provide the generated output pixels to the blend unit; and wherein the blend unit is configured to blend at least the generated output pixels with a video stream to produce corresponding output frames for display.

8. The display pipe as recited in claim 6, wherein the respective corresponding pixel grid is a 2×2 grid of four adjacent pixels, wherein each of the four adjacent pixels has a vertically adjacent pixel, a horizontally adjacent pixel, and a diagonally adjacent pixel.

9. The display pipe as recited in claim 8, wherein to assign an estimated pixel value to the first pixel, the interface unit is further configured to:

when the vertically adjacent pixel and the horizontally adjacent pixel are active, set the estimated pixel value to an average color value of the vertically adjacent pixel and the horizontally adjacent pixel;

when only one of the vertically adjacent pixel and the horizontally adjacent pixel is active, set the estimated pixel value to a color value of the active one of the vertically adjacent pixel and the horizontally adjacent pixel; and when neither of the vertically adjacent pixel and the horizontally adjacent pixel is active, and the diagonally adjacent pixel is active, set the estimated pixel value to a color value of the diagonally adjacent pixel.

10. A method comprising:

defining an active region of an image frame, wherein pixels within the defined active region of the image frame are active pixels to be displayed and pixels outside the defined active region of the image frame are inactive pixels not to be displayed;

fetching the image frame from system memory, comprising fetching the active pixels of the image frame from the system memory and not fetching the inactive pixels of the image frame from system memory; and producing upscaled pixels for the fetched active pixels of the image frame, comprising:

producing each respective upscaled pixel of the upscaled pixels based on a respective corresponding pixel grid in the image frame;

identifying, for each respective upscaled pixel, specific pixels in the respective corresponding pixel grid that are inactive pixels;

generating a respective estimated color value corresponding to each identified specific pixel in the respective corresponding pixel grid according to respective color values of one or more active pixels in the respective corresponding pixel grid; and including each respective estimated color value in the respective corresponding pixel grid in place of each identified specific pixel.

11. The method as recited in claim 10, further comprising producing an output image frame, comprising blending at least the upscaled pixels with one or more of:

pixels of one or more other image frames; or pixels of one or more video streams.

12. The method as recited in claim 10, wherein producing the upscaled pixels comprises generating a respective output pixel from each respective corresponding pixel grid according to a bilinear interpolation algorithm.

13. The method as recited in claim 12, further comprising controlling the bilinear interpolation algorithm through a register comprising a specified number of bits representing a fixed point number;

wherein a first portion of the specified number of bits represents an integer portion of the fixed point number, and a remaining portion of the specified number of bits represents a fraction portion of the fixed point number; and wherein the integer portion of the fixed point number specifies which two pixels are provided as inputs to the bilinear interpolation algorithm, and the fractional portion of the fixed point number specifies a weighting factor for the bilinear interpolation algorithm.

14. The method as recited in claim 10, wherein producing the upscaled pixels comprises performing vertical scaling and horizontal scaling.

15. A method comprising:

writing image information comprising one or more image frames into one or more frame buffers, wherein the one or more image frames are defined by a plurality of pixels;

writing active region information corresponding to at least one image frame of the one or more image frames into one or more registers, wherein the active region information defines respective active regions of the at least one image frame, wherein pixels of the plurality of pixels that are within the active regions are active pixels of the at least one image frame to be displayed, and pixels of the plurality of pixels that are outside the active regions are inactive pixels of the at least one image frame not to be displayed;

fetching the at least one image frame from the one or more frame buffers, comprising:

fetching the active pixels of the at least one image frame according to the corresponding active region information obtained from the one or more registers; and not fetching the inactive pixels of the at least one image frame;

supplying respective predefined values corresponding to the unfetched inactive pixels;

scaling the fetched active pixels of the at least one image frame, comprising generating each scaled pixel based on a respective corresponding pixel grid in the at least one image frame, further comprising replacing the respective predefined values corresponding to unfetched inactive pixels comprised in the respective corresponding pixel grid in the at least one image frame with respective estimated values generated based on active pixels in the respective corresponding pixel grid in the at least one image frame; and providing the scaled pixels to a blend circuit.

16. The method as recited in claim 15, further comprising the blend circuit blending the scaled pixels with pixels received from a video pipe to generate one or more output frames, and providing the one or more output frames to a display controller for displaying the one or more output frames on a display.

17. The method as recited in claim 15, wherein the respective corresponding pixel grid comprises adjacent pixels including one or more of the fetched active pixels;

wherein replacing the respective predefined values corresponding to unfetched inactive pixels comprised in the respective corresponding pixel grid comprises determining the respective estimated values from respective values of the one or more of the fetched active pixels included in the corresponding grid.

18. The method as recited in claim 15, wherein scaling the fetched active pixels comprises performing bilinear filtering on the fetched active pixels, comprising one of:

vertically upscaling the fetched active pixels followed by horizontally upscaling the fetched active pixels; or horizontally upscaling the fetched active pixels followed by vertically upscaling the fetched active pixels.

19. The method as recited in claim 15, wherein scaling the fetched active pixels comprises scaling color values, comprising separately scaling each component of the color values, and alpha (transparency) values.

20. A system comprising:

system memory comprising:

at least one frame buffer configured to store image frame information that defines corresponding image frames; and a video buffer configured to store video frame information defining corresponding video frames;

at least one register configured to store active region information that defines respective active regions of the image frames, wherein pixels within the respective active regions of each image frame of the image frames are active pixels of the image frame to be displayed, and pixels outside of the respective active regions of each image frame of the image frames are inactive pixels of the image frame not to be displayed;

a first fetch unit configured to:

fetch, from the at least one frame buffer, image frame information of the active pixels of the image frame, responsive to the stored active region information; and not fetch image frame information of the inactive pixels of the image frame, responsive to the stored active region information;

a scaler configured to generate scaled pixel values from the image frame information of the active pixels of the image frame, wherein to generate each given scaled pixel value of the scaled pixel values, the scaler is configured to:

determine the given scaled pixel value from image frame information of a respective corresponding pixel grid in the image frame, the respective corresponding pixel grid comprising at least one of the fetched active pixels;

determine an estimated value for inactive pixels in the respective corresponding pixel grid based on image frame information of fetched active pixels in the respective corresponding pixel grid, and use the estimated value and the frame information of the fetched active pixels in the respective corresponding pixel grid in determining the scaled pixel value;

a second fetch unit configure to fetch the video frame information from the video buffer; and a blend unit configured to blend the scaled pixel values with the fetched video frame information to produce output frames.

21. The system as recited in claim 20, wherein the respective corresponding pixel grid comprises a specified number of adjacent pixels, wherein the scaler is further configured to determine the estimated value for each inactive pixel within the respective corresponding pixel grid based on respective positions of the fetched active pixels in the respective corresponding pixel grid relative to the inactive pixel.

22. The system as recited in claim 21, wherein the first fetch unit is further configured to provide predefined image frame information corresponding to the inactive pixels, and the scaler is further configured to replace the predefined image frame information with the estimated value for the inactive pixels in the respective corresponding pixel grid.

23. The system as recited in claim 20, wherein the scaler comprises:

a vertical component configured to generate vertically scaled pixel values; and a horizontal component configured to receive the vertically scaled pixel values and generate a horizontally scaled pixel values based on the received vertically scaled pixel values to produce the scaled pixel values.

* * * * *